US00RE49322E

(19) United States
(12) Reissued Patent
Holub et al.

(10) Patent Number: US RE49,322 E
(45) Date of Reissued Patent: Nov. 29, 2022

(54) PORTABLE DEVICE DETECTION

(71) Applicant: Ford Global Technologies, LLC, Dearborn, MI (US)

(72) Inventors: Patrick Kevin Holub, Novi, MI (US); John Robert Van Wiemeersch, Novi, MI (US); Adil Nizam Siddiqui, Farmington Hills, MI (US); Jeffrey Allen Greenberg, Ann Arbor, MI (US); Brad Alan Ignaczak, Canton, MI (US)

(73) Assignee: Ford Global Technologies, LLC, Dearborn, MI (US)

(21) Appl. No.: 17/109,637

(22) Filed: Dec. 2, 2020

Related U.S. Patent Documents

Reissue of:
(64) Patent No.: 10,735,895
Issued: Aug. 4, 2020
Appl. No.: 15/757,000
PCT Filed: Oct. 16, 2015
PCT No.: PCT/US2015/055926
§ 371 (c)(1),
(2) Date: Mar. 2, 2018
PCT Pub. No.: WO2017/065799
PCT Pub. Date: Apr. 20, 2017

(51) Int. Cl.
*H04W 4/33* (2018.01)
*H04M 1/72457* (2021.01)
(Continued)

(52) U.S. Cl.
CPC ..... *H04W 4/33* (2018.02); *H04M 1/72457* (2021.01); *H04W 4/023* (2013.01); *H04M 1/6008* (2013.01)

(58) Field of Classification Search
CPC ... H04W 4/33; H04W 4/023; H04M 1/72457; H04M 1/6008
See application file for complete search history.

(56) References Cited

U.S. PATENT DOCUMENTS 6,279,946 B1 8/2001 Johnson et al.
6,574,557 B2 * 6/2003 Endo ..... G01S 19/22 342/357.29
(Continued)

FOREIGN PATENT DOCUMENTS

CN 1914952 A 2/2007
CN 102680944 A 9/2012
(Continued)

OTHER PUBLICATIONS

Chinese First Office Action as issued by the China National Intellectual Property Administration dated Mar. 5, 2020, 33 pages.
(Continued)

*Primary Examiner* — Catherine M Tarae
(74) *Attorney, Agent, or Firm* — Brandon Hicks; Bejin Bieneman PLC

(57) ABSTRACT

A plurality of transducers positioned at respective specified locations in a vehicle are actuated to generate a plurality of respective tones. A plurality of respective time differences are determined between times that each respective tone is generated by the respective transducer and the tone is detected by a portable device. A location of the portable device is determined based at least in part on the time differences.

20 Claims, 8 Drawing Sheets

(51) Int. Cl.

*H04W 4/02* (2018.01)
*H04M 1/60* (2006.01)

(56) References Cited

U.S. PATENT DOCUMENTS

| | | | | |
|---|---|---|---|---|
| 7,301,467 | B2 | 11/2007 | Ishimura et al. | |
| 8,301,369 | B2 * | 10/2012 | Hiruta | G01C 21/30 701/408 |
| 8,571,575 | B2 * | 10/2013 | Fukuta | G01S 19/42 455/456.6 |
| 8,760,283 | B2 * | 6/2014 | Lickfelt | B60R 25/24 340/426.36 |
| 9,042,426 | B1 | 5/2015 | Matsumoto et al. | |
| 9,337,914 | B2 * | 5/2016 | Nguyen | H04B 7/15507 |
| 10,726,281 | B2 * | 7/2020 | Ali | G06V 40/28 |
| 2008/0157940 | A1 | 7/2008 | Breed et al. | |
| 2009/0046538 | A1 | 2/2009 | Breed et al. | |
| 2013/0078968 | A1 * | 3/2013 | Breed | G01S 13/878 455/414.1 |
| 2014/0273859 | A1 * | 9/2014 | Luna | H04W 4/023 455/41.3 |
| 2014/0335902 | A1 | 11/2014 | Guba et al. | |
| 2015/0104038 | A1 | 4/2015 | Kim | |
| 2015/0204965 | A1 * | 7/2015 | Magarida | G01S 5/26 367/117 |
| 2017/0276764 | A1 | 9/2017 | Vilermo et al. | |

FOREIGN PATENT DOCUMENTS

| | | | |
|---|---|---|---|
| KR | 20130089069 | A | 8/2013 |
| WO | 2015070064 | A1 | 5/2015 |
| WO | 2015106415 | A1 | 7/2015 |

OTHER PUBLICATIONS

Chinese Second Office Action as issued by the China National Intellectual Property Administration dated Nov. 3, 2020, 5 pages.
Notification of Transmittal of the International Search Report and the Written Opinion of the International Searching Authority dated Jan. 11, 2016, 12 pages.

* cited by examiner

PORTABLE DEVICE DETECTION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

This patent application is filed under 35 U.S.C. § 371 as a national stage of, and as such claims priority to, International Patent Application No. PCT/US2015/055926, filed on 16 Oct. 2015, the foregoing application is incorporated herein by reference in its entirety.

BACKGROUND

Conventional vehicle systems may include user settings transferrable between vehicles. The user settings may include preferred radio stations, preferred climate control settings, etc. However, multiple vehicle occupants may have differing user settings when occupying the same vehicle.

DETAILED DESCRIPTION

Figure 1:
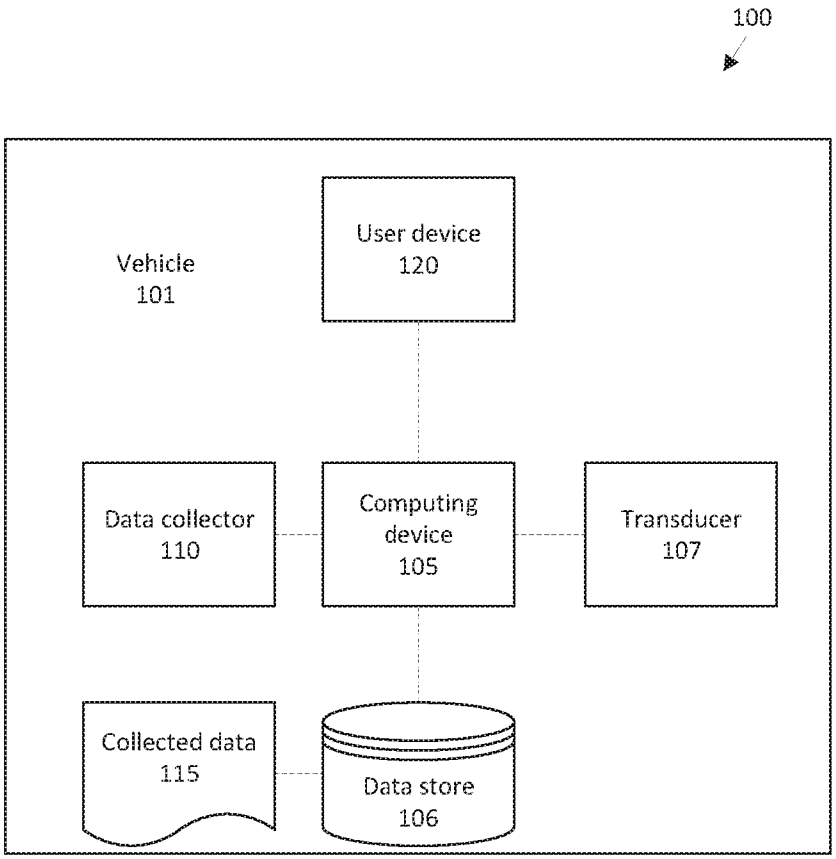
FIG. 1 is a block diagram of a system for determining a location of a portable device in a vehicle.

FIG. 1 illustrates a system 100 including a portable device 120 communicatively coupled, e.g., via a known wireless protocol, to a vehicle 101 computing device 105. The computing device 105 is programmed to receive collected data 115, from one or more data collectors 110, e.g., vehicle 101 sensors, concerning various metrics related to the vehicle 101. For example, the metrics may include a velocity of the vehicle 101, vehicle 101 acceleration and/or deceleration, data related to vehicle 101 path or steering, audio tones from the vehicle 101 cabin, biometric data related to a vehicle 101 operator, e.g., heart rate, respiration, pupil dilation, body temperature, state of consciousness, etc. Further examples of such metrics may include measurements of vehicle systems and components (e.g., a steering system, a powertrain system, a brake system, internal sensing, external sensing, etc.). The computing device 105 may be programmed to collect data 115 from the vehicle 101 in which it is installed, sometimes referred to as a host vehicle 101, and/or may be programmed to collect data 115 about a second vehicle 101, e.g., a target vehicle.

The computing device 105 is generally programmed for communications on a controller area network (CAN) bus or the like. The computing device 105 may also have a connection to an onboard diagnostics connector (OBD-II). Via the CAN bus, OBD-II, and/or other wired or wireless mechanisms, e.g., WiFi, Bluetooth, or the like, the computing device 105 may transmit messages to various devices in a vehicle 101, e.g., devices 120 discussed below, and/or receive messages from the various devices, e.g., controllers, actuators, sensors, etc., including data collectors 110. Alternatively or additionally, in cases where the computing device 105 actually comprises multiple devices, the CAN bus or the like may be used for communications between devices represented as the computing device 105 in this disclosure.

The data store 106 may be of any known type, e.g., hard disk drives, solid-state drives, servers, or any volatile or non-volatile media. The data store 106 may store the collected data 115 sent from the data collectors 110.

The vehicle 101 may include one or more transducers 107. The transducers 107 may include known devices that produce tones, i.e. sound waves, at various frequencies, e.g., ultrasonic tones with frequencies above the human hearing range (e.g. in excess of 20 kHz), subsonic tones with frequencies below the human hearing range (e.g. below 20 Hz), sound waves within the human hearing range, etc. A transducer 107 may be situated in various parts of the vehicle 101, including, e.g., an instrument panel, a vehicle door, a vehicle pillar, etc. As is known, transducers 107 may send tones at specific frequencies and/or with specific signatures, such that the tone can be identified as sent from a particular transducer at a particular time.

Data collectors 110 may include a variety of devices. For example, various controllers in a vehicle may operate as data collectors 110 to provide data 115 via the CAN bus, e.g., data 115 relating to vehicle speed, acceleration, system and/or component functionality, etc., of any number of vehicles 101. Further, sensors or the like, could be included in a vehicle and configured as data collectors 110 to provide data directly to the computer 105, e.g., via a wired or wireless connection. Yet other data collectors 110 could include cameras, microphones, breathalyzers, motion detectors, etc., i.e., data collectors 110 to provide data 115 for evaluating a condition or state of a vehicle 101 operator and/or collect audio and/or visual data from the vehicle 101 cabin. Further still, the data collectors 110 may include a receiving device configured to receive ultrasonic tones from the transducer 107.

Collected data 115 may include a variety of data collected in a vehicle 101. Examples of collected data 115 are provided above, and moreover, data 115 is generally collected using one or more data collectors 110, and may additionally include data calculated therefrom in the computer 105. In general, collected data 115 may include any data that may be gathered by the data collectors 110 and/or computed from such data.

The portable device 120 may be any one of a variety of computing devices including a processor and a memory, as well as communication capabilities that is programmed to be worn on an operator's body. For example, the portable device 120 may be a wearable device, e.g. a watch or a smart watch, a smartphone, a tablet, a personal digital assistant, a watch-phone pairing, a vibrating apparatus, etc. that includes capabilities for wireless communications using IEEE 802.11, Bluetooth, and/or cellular communications protocols. Further, the portable device 120 may use such communications capabilities to communicate directly with a vehicle computer 105, e.g., using Bluetooth. The portable device 120 may store in its memory vehicle 101 settings, e.g. preferred entertainment settings, climate control settings, etc., that a vehicle 101 occupant may want to apply to the vehicle 101. However, if there are multiple portable devices 120, it may be preferable to apply the settings of the portable device 120 associated with a vehicle owner and/or occupant of an operator's seat. Thus, the present system 100 advantageously provides a determination of respective locations of one or more portable devices 120 in the vehicle 101, can then apply settings of a selected portable device, e.g., a wearable device worn by an occupant of an operator's seat, accordingly.

Figure 2:
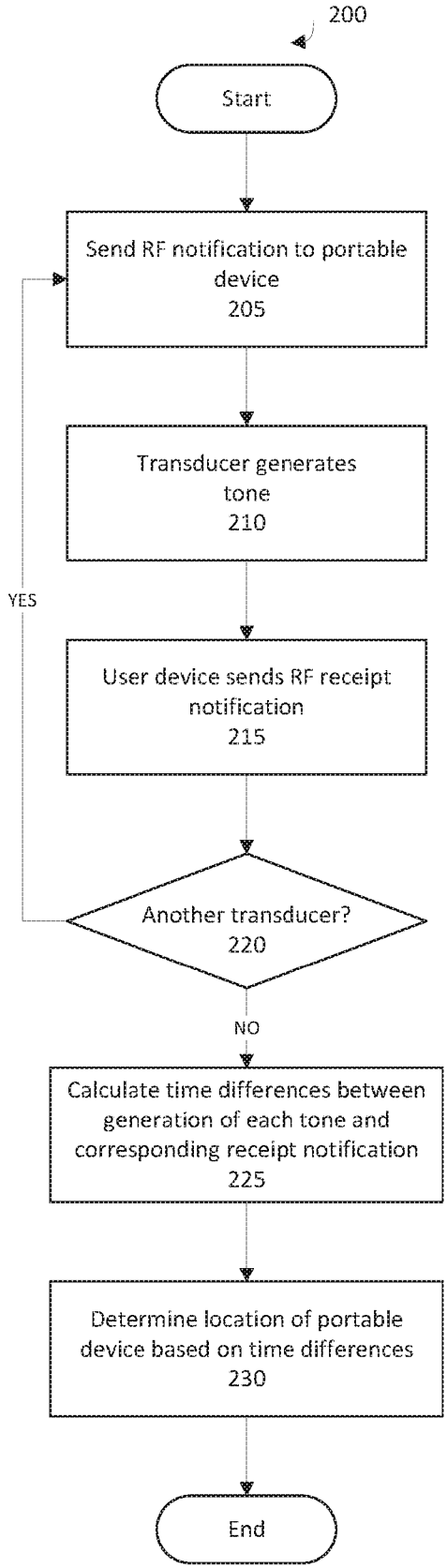
FIG. 2 is an exemplary process for determining the location of the portable device in the vehicle.

FIG. 2 illustrates a process 200 for determining a location of the portable device 120 in the vehicle 101. The process 200 starts in a block 205, in which the computing device 105 sends a notification to the portable device 120. The notification notifies the portable device 120 that the computing device 105 will begin determining the location of the portable device 120. The notification may be a radiofrequency (RF) signal, e.g. $RF_1$ shown in FIG. 7, sent, e.g., over a network, including over WiFi, Bluetooth, etc.

Next, in a block 210, the computing device 105 provides an instruction to a first transducer 107 to generate a first tone. The first tone may be an ultrasonic tone, i.e., a sound wave having a frequency in excess of 20 kHz, which may be outside the typical known range of a human's hearing but within the sound detection capability of the portable device 120. The first tone can be received by the portable device 120 in the vehicle 101. The computing device 105 records the time of sending the instruction. The computing device 105 may provide the instruction to the first transducer 107 substantially simultaneously as the start notification.

Next, in a block 215, the portable device 120 sends a first receipt notification upon receipt of the first tone. The first receipt notification may be an RF signal such that the computing device 105 may receive the first receipt notification nearly immediately after the portable device 120 receives the first tone. Upon receipt of the receipt notification by the receiving device, the computing device 105 records the time of receipt.

Next, in a block 220, the computing device 105 determines whether there is another transducer 107 that must send a respective tone. For example, a vehicle 101 may include three transducers 107, and the computing device 105 may repeat the steps 205-215 for each transducer. If the computing device 105 determines that another transducer 107 must send a tone, the process returns to the bock 205 to repeat the steps 205-215. If all transducers 107 have generated their tones, the process continues in a block 225.

In the block 225, the computing device 105 determines respective time differences between each notification and its respective receipt notification. The computing device 105 compares the recorded time for each notification to the recorded time for each response notification to find a time difference for each transducer 107. For example, a first time difference $TD_1$ is the time between the first start notification sent by the computing device 105 and the first response notification received by the computing device 105. The computing device 105 repeats this calculation of the time difference for all transducers 107. In another example, the computing device 105 may account for the time delay of the notifications and the receipt notifications if the time of RF propagation for the notifications and the receipt notifications are large enough to affect the time differences.

Figure 6:
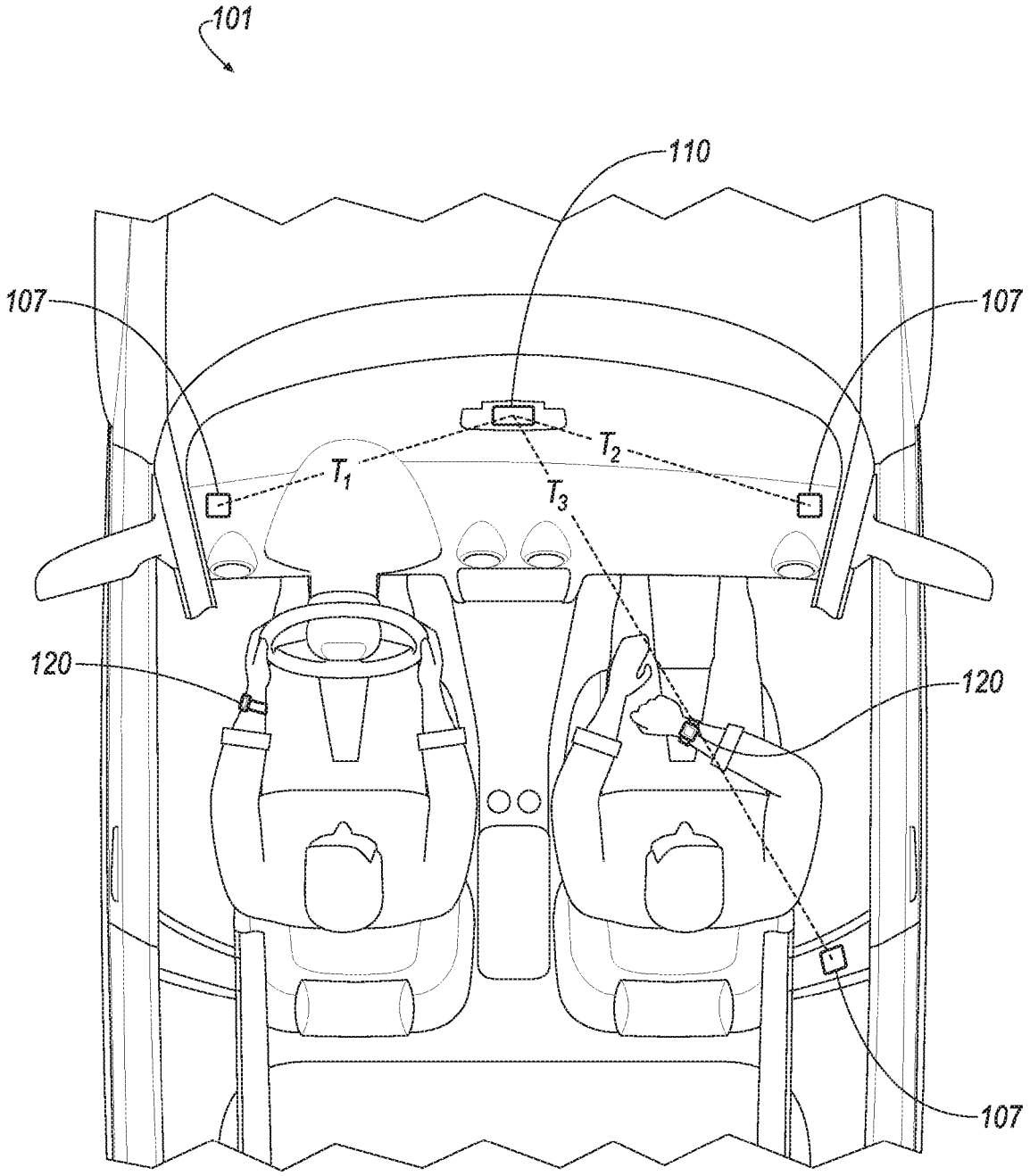
FIG. 6 is a plan view of a vehicle with a pair of portable devices.

Next, in a block 230, the computing device 105 determines the location of the portable device 120 based on the time differences, and the process 200 ends. The location may be determined using trilateration based on the distance of the portable device 120 to the transducers 107. Trilateration as that term is used herein refers to the known technique of determining distances between points using geometric characteristics of circles, triangles, ellipses, ellipsoids, and/or spheres. The distance from the first transducer 107 to the receiving device $T_1$ is known to the computing device 105 and is fixed, e.g., when the first transducer 107 is mounted on a fixed surface, as shown in FIG. 6. If the first transducer 107 is, e.g., installed in a vehicle 101 door, the distance $T_1$ may be determined when the vehicle 101 door is closed, providing a consistent measurement for $T_1$. In another example, the vehicle 101 door may include data collectors 110, e.g. angle sensors, to detect the angle of an open vehicle 101 door, and the distance $T_1$ may be determined based on the measurement from the data collectors 110. That is, if the first transducer 107 is at a specified location that is not fixed, the distance $T_1$ may be determined with additional data collectors 110.

Figure 7:
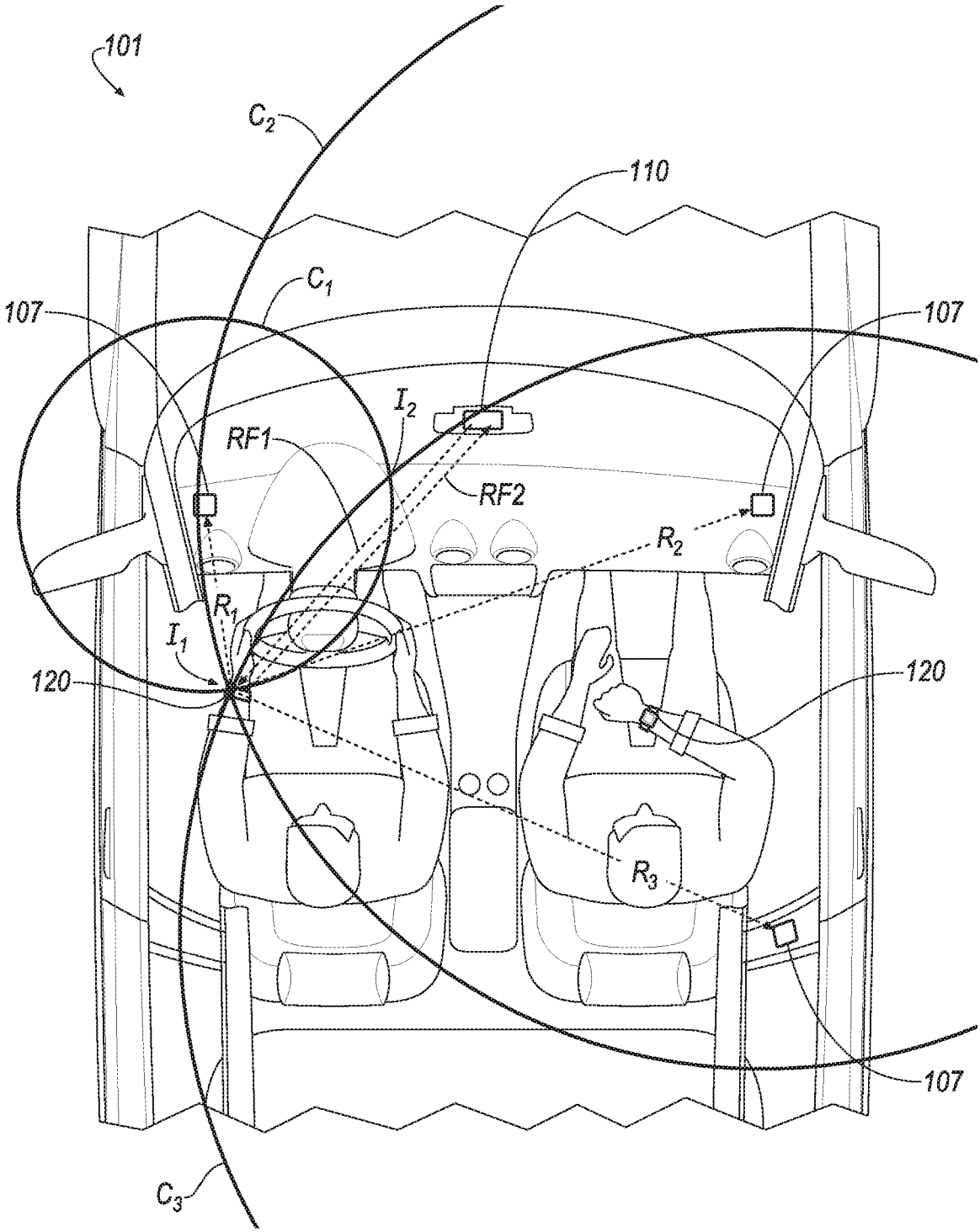
FIG. 7 is a plan view of the vehicle illustrating determining the location of the portable devices using trilateration with circles.

The distance from the first transducer 107 and the portable device 120 may be determined as follows:

$$R_1=v_sTD_1$$

where $R_1$ is the distance from the first transducer 107 to the portable device 120, $v_s$ is the speed of sound in air, and $TD_1$ is the first time difference. The distance defines a radius along which the portable device 120 may be located from the first transducer 107, as shown in FIG. 7. However, this distance $R_1$ alone cannot determine the location of the portable device 120, as explained further below.

The distances from the second and third transducers 107 and the portable device 120, may be similarly determined, producing a second distance $R_2$ and a third distance $R_3$ respectively, as shown in FIG. 7. Each distance defines a radius with the respective transducer 107 at the center along which the portable device is located. The three distances meet at a single point—the location of the portable device 120 in the vehicle 101, as shown in FIG. 7. That is, the location of the portable device 120 is determined based on the time differences using trilateration. If the transducers 107 are not in the same plane, i.e., at different heights relative to, e.g., a vehicle 101 floor, then the radii $R_1$, $R_2$, $R_3$ define spheres around the transducers 107. The spheres similarly resolve to a single point, being the location of the portable device 120.

Figure 3:
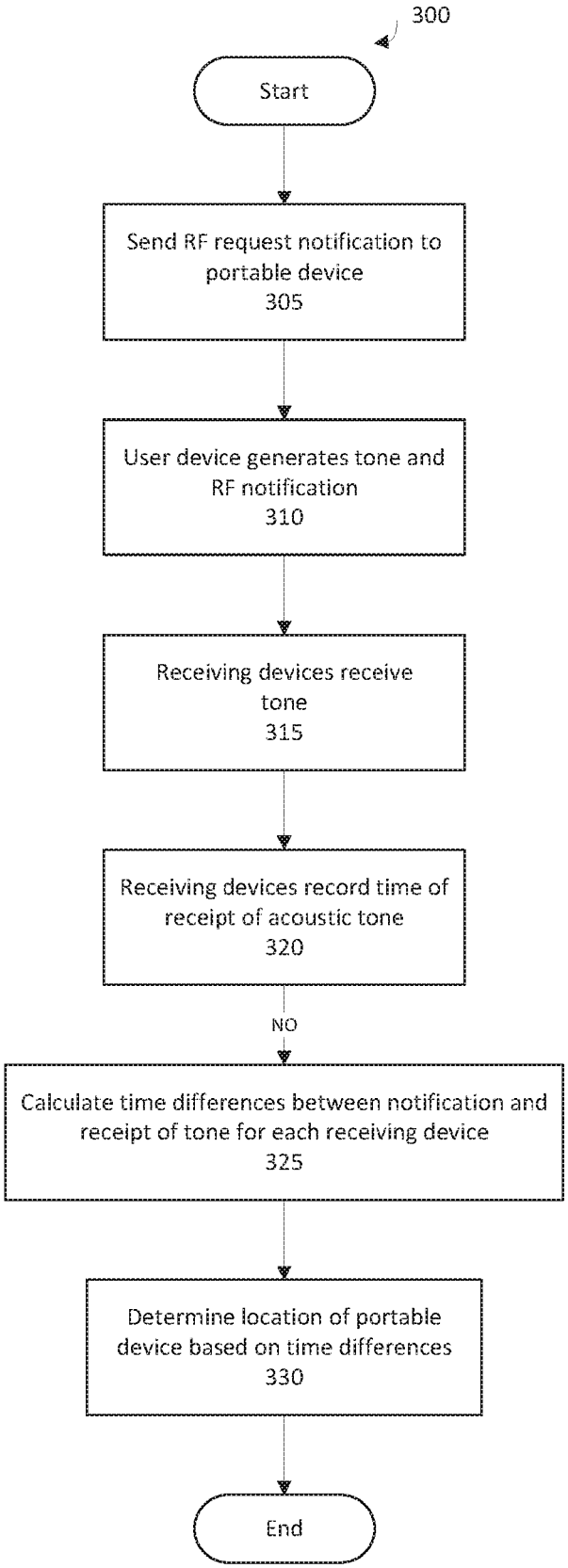
FIG. 3 is another exemplary process for determining the location of the portable device in the vehicle.

FIG. 3 illustrates another exemplary process 300 for determining a location of the portable device 120 in the vehicle 101. The process 300 starts in a block 305 where the computing device 105 sends an instruction to the portable device 120 to generate a tone. The instruction may be a notification sent over an RF signal, e.g. $RF_1$ as shown in FIG. 7.

Next, in a block 310, the portable device 120 generates the tone. The tone may be an ultrasonic tone, i.e., having a frequency in excess of 20 kHz, and travels through the air in the vehicle 101. The tone may alternatively have a frequency at or below 20 kHz. The portable device 120 also sends a receipt notification, e.g. $RF_2$ as shown in FIG. 7, to the computing device 105 indicating the generation of the tone.

Next, in a block 315, a plurality of data collectors 110, e.g. receiving devices, receive the tone. The data collectors 110 may be located in the same locations as the transducers 107 shown in FIGS. 6-8.

Next, in a block 320, each receiving device records the time of receipt of the tone.

Next, in a block 325, the computing device 105 collects a time of receipt of the tone for each receiving device and calculates a respective time difference for each receiving device. As described in the block 225 above, the computing device compares the time of the receipt notification to the time of the receipt of the tone to determine a time difference for each receiving device.

Next, in a block 330, the computing device 105 determines the location of the portable device 120 based on the time differences, and the process 300 ends. As in the block 230 above, the computing device 105 uses the time differences to determine radii around the receiving devices, from which the location of the portable device 120 is determined using trilateration, as shown in FIG. 7.

Figure 4:
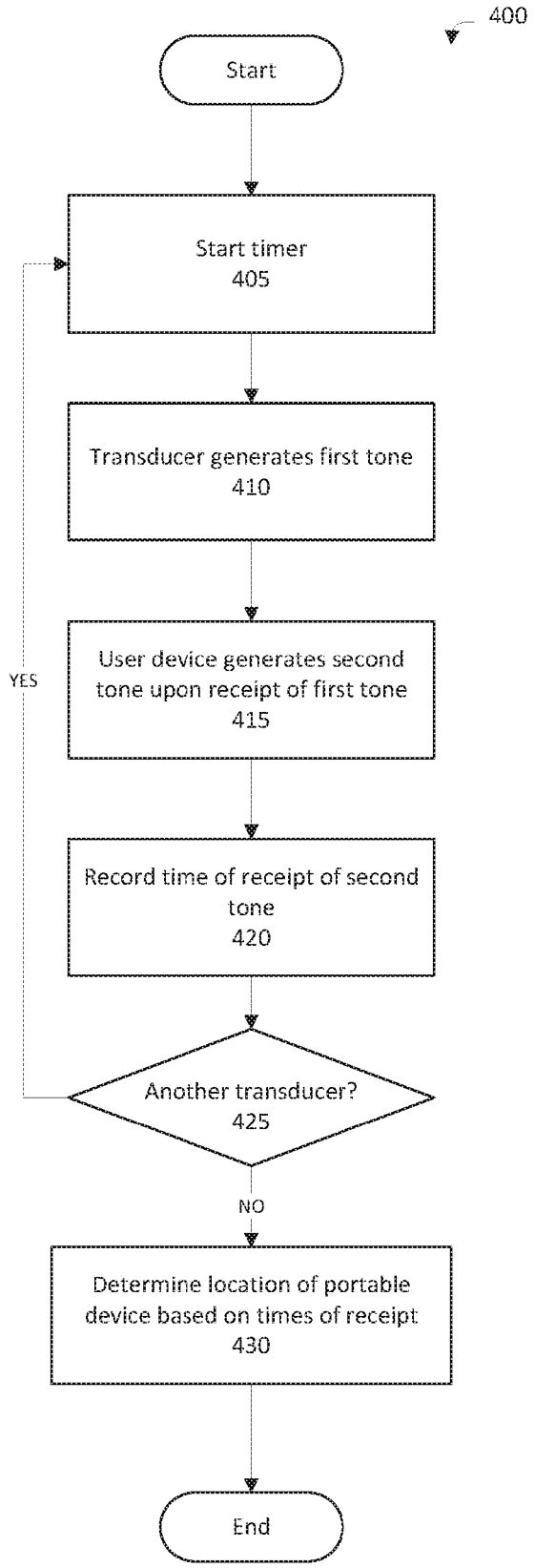
FIG. 4 is another exemplary process for determining the location of the portable device in the vehicle.

FIG. 4 illustrates another exemplary process 400 for determining the location of the portable device 120. The process 400 starts in a block 405, where the computing device 105 starts a timer, e.g., starts recording periods of time.

Next, in a block 410, the computing device 105 provides an instruction to actuate the first transducer 107 to generate the first tone. The tone may be, e.g., an ultrasonic tone.

Next, in a block 415, the portable device 120, upon receipt of the first tone, generates a second tone. The second tone may be, e.g., an ultrasonic tone.

Next, in a block 420, the computing device 105 receives the second tone via the receiving device and records the time of receipt of the second tone.

Next, in a block 425, the computing device 105 determines if there are other transducers 107 that have not generated tones. If so, the computing device 105 repeats the steps 405-420 for each transducer 107. If all transducers 107 have generated tones, the process continues in a block 430.

Figure 8:
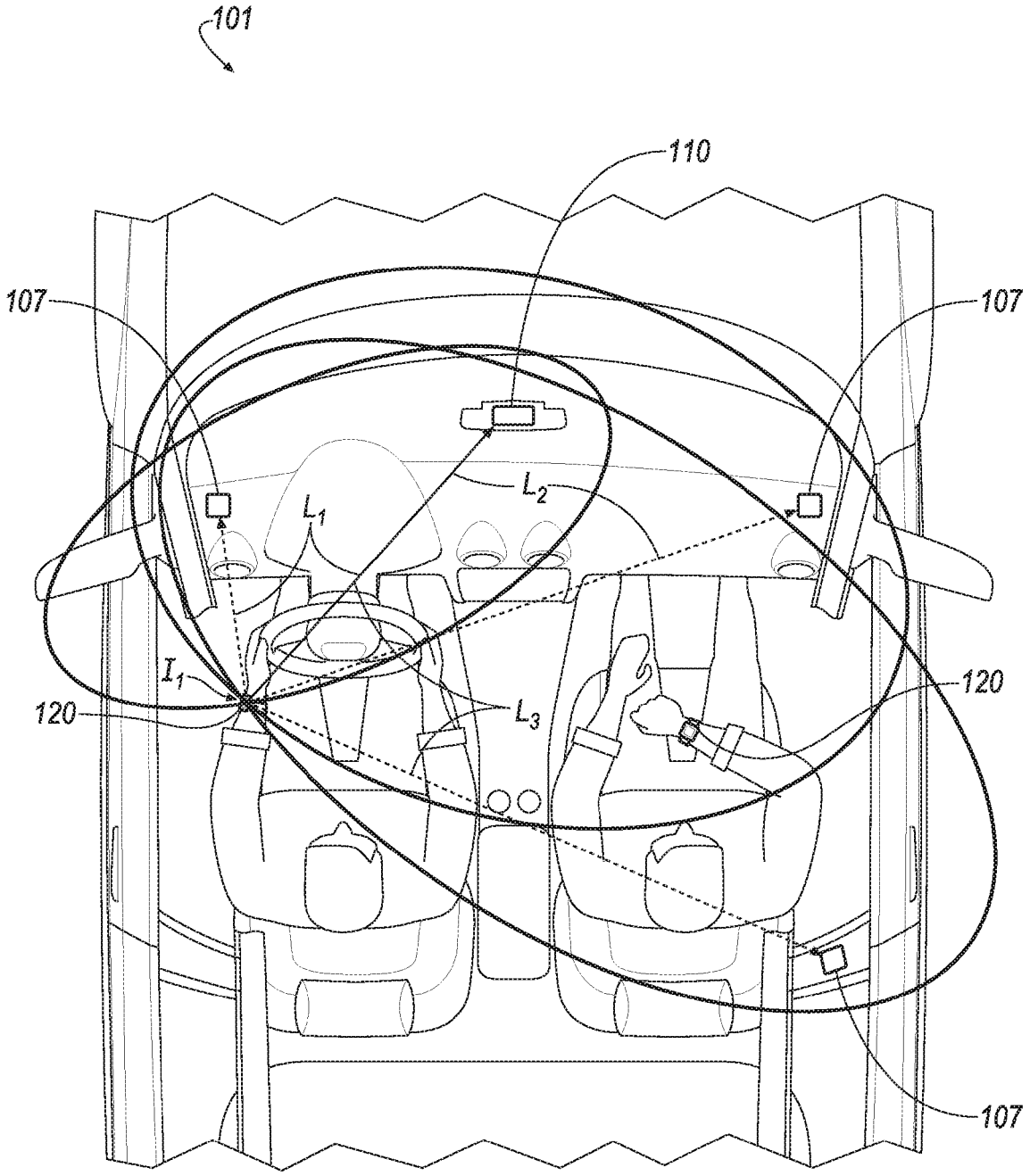
FIG. 8 is a plan view of the vehicle illustrating determining the location of the portable devices using trilateration with ellipses.

In the block 430, the computing device 105 determines the location of the portable device 120 based on the times of receipt. As shown in the example of FIG. 6, the distance between the transducers 107 and the receiving device is known for all transducers. As shown in FIG. 8, each transducer and the receiving device serve as foci that define an ellipse having a major axis defined by the portable device 120. For example, the first major axis may be defined as:

$$L_1=v_sTD_1$$

where $L_1$ is the major axis of the first ellipse, $v_s$ is the speed of sound in air, as is known, and $TD_1$ is the time of receipt of the second tone for the first transducer 107. Based on the major axis $L_1$ and the location of the first transducer 107 and the receiving device, the computing device 105 may define an ellipse on which the portable device 120 must be located. The computing device 105 may define ellipses for all transducers 107; for example, if the vehicle 101 includes three transducers 107, the computing device 105 may define major axes $L_2$, $L_3$ for the second and third transducers, respectively, and thus define a total of three ellipses. The three ellipses intersect at a single point—the portable device 120. That is, the computing device 105 may use trilateration to determine the position of the portable device 120 using ellipses defined by the locations of the transducers and the receiving devices, and the major axis for each ellipse as defined by the time of receipt. If the transducers 107 are not in the same plane, as described above, the major axes $L_1$, $L_2$, $L_3$ define ellipsoids that intersect at the location of the portable device 120.

The computing device 105 may alternatively compare the times of receipt to determine the location of the portable device 120. For example, as shown in FIG. 6-8, a first transducer 107 may be located in front of a vehicle operator, a second transducer 107 may be located in front of a vehicle passenger, and a third transducer 107 may be located behind a vehicle passenger. The first transducer 107 produces a first time of receipt $TD_1$, the second transducer 107 produces a second time of receipt $TD_2$, and the third transducer 107 produces a third time of receipt $TD_3$. Because the first transducer 107 is closest to the vehicle operator, if $TD_1$ is smaller than either of $TD_2$ or $TD_3$ (i.e., $TD_1<TD_2, TD_3$), then the portable device 120 is closest to the first transducer 107, and the portable device 120 may be located near the vehicle operator. Similarly, if $TD_2<TD_1$, $TD_3$, then the portable device 120 may be located near the vehicle passenger in a front passenger seat. And if $TD_3<TD_1$, $TD_2$, then the portable device 120 may be located in a rear passenger seat.

Figure 5:
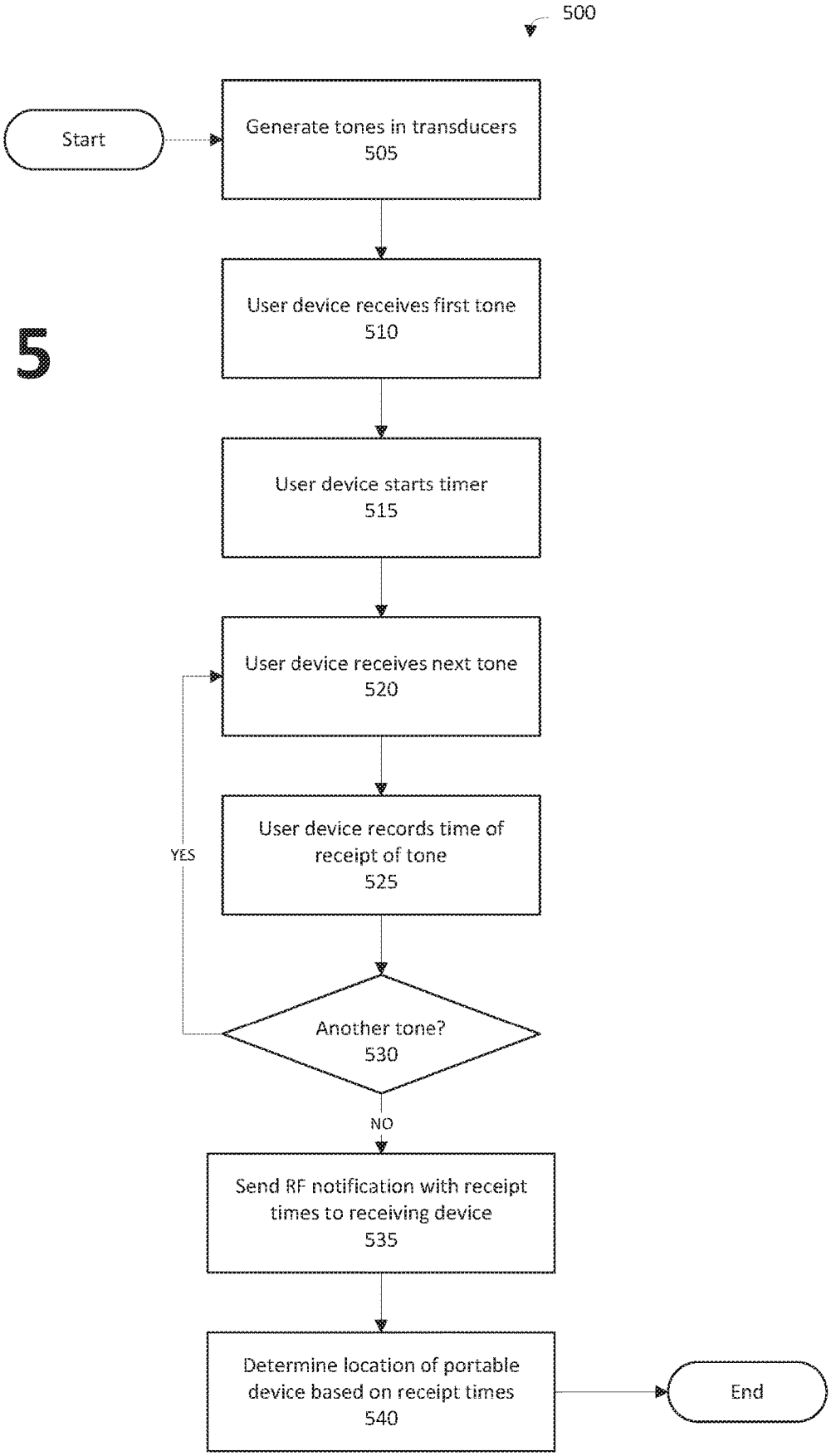
FIG. 5 is another exemplary process for determining the location of the portable device in the vehicle.

FIG. 5 illustrates another exemplary process 500 for determining the location of the portable device 120. The process 500 begins in a block 505, where the computing device 105 sends an instruction to all transducers 107 to generate tones simultaneously.

Next, in a block 510, the portable device 120 receives a first tone.

Next, in a block 515, the portable device 120 starts a timer upon receipt of the first tone.

Next, in a block 520, the portable device 120 receives another tone.

Next, in a block 525, upon receipt of the tone, the portable device 120 records the time of receipt of the tone from the timer. The time of receipt is the time difference from the receipt of the first tone to the receipt of the current tone.

Next, in a block 530, the portable device 120 determines if all tones have been received. The portable device 120 may know the number of transducers 107, and may be programmed to receive the same number of tones. That is, the portable device 120 will record times of receipt for tones for each transducer 107. If the portable device 120 has not received all of the tones, the process 500 returns to the block 520 and repeats the steps 520-530 for all transducers 107. Alternatively, the process 500 may collect as many tones as possible during a predetermined time window. Otherwise, the process continues in a block 535.

In the block 535, the portable device 120 sends a receipt notification to the receiving device to provide information to the computing device 105 with the times of receipt for each transducer 107.

Next, in a block 540, the computing device determines the location of the portable device 120 based on the times of receipt. As shown in FIG. 7 and described in the processes 200, 300, the computing device 105 can determine the position of the portable device 120 according to trilateration using the times of receipt to determine radii defining circles around the transducers 107; where the circles intersect is the location of the portable device 120.

FIG. 6 illustrates a portion of an exemplary vehicle 101 including transducers 107 disposed in the vehicle 101 instrument panel and in a vehicle 101 door. The data collector 101. e.g. the receiving device, may be disposed in a vehicle 101 rearview mirror. In this example two portable devices 120, e.g. smart watches, are being worn in the vehicle 101. One of the portable devices 120 may be worn on a wrist of a vehicle operator, and is shown here close to a vehicle 101 steering wheel where the operator's wrist may be located. The other portable device 120 may be located on the wrist of an occupant in a vehicle 101 passenger seat. Upon applying one of the processes 200-500, the portable device 120 worn by the operator (near the steering wheel) can be located and vehicle 101 settings from the operator's portable device 120 may be applied. Specifically, the portable device 120 may be determined to be located on the operator's side of the vehicle 101 cabin, and the computing device 105 may apply user settings from that portable device 120 and ignore the portable device 120 located on the passenger's side of the vehicle 101 cabin.

FIG. 6 illustrates the distances between the transducers 107 and the receiving device, here a data collector 110. The distance $T_1$ is the distance from the data collector 110 to the first transducer 107; the distance $T_2$ is the distance from the data collector 110 to the second transducer 107; the distance $T_3$ is the distance from the data collector 110 to the third transducer 107. The distances $T_1$, $T_2$, $T_3$ are known and may be stored in the data store 106.

FIG. 7 illustrates a portion of an exemplary vehicle 101. As described in the processes 200, 300, and 500 above, the computing device 105 uses the time differences to determine the distances from the transducers 107 to the portable device 120 with trilateration. For example, as shown in FIG. 6, the distance $T_1$ from the first transducer 107 and the receiving device is predetermined and stored in the data store 106. The receiving device receives the receipt notification $RF_2$ from the portable device 120 and determines a time difference $TD_1$ between the first tone and the first response tone. e.g., the amount of time between the notification $RF_1$ and the receipt notification $RF_2$. With the first transducer 107, the distance $R_1$ defines a circle $C_1$ around the transducer 107 on which the portable device 120 falls.

The distance $T_2$, shown in FIG. 6, from the second transducer 107 to the receiving device is known and stored in the data store 106. The time difference $TD_2$ is determined similarly to $TD_z$ described above. Based on the time difference $TD_2$, the distance $R_2$ and defined circle $C_2$ around the second transducer 107 is determined. The circle $C_1$ and the circle $C_2$ intersect at two points, $I_1$ and $I_2$, and with the calculations from two transducers, the portable device 120 may be at either point $I_1$ or $I_2$.

The distance $T_3$, shown in FIG. 6, from the third transducer 107 to the receiving device is known and stored in the data store 106. The time difference $TD_3$ is determined similarly to $TD_1$ and $TD_2$. Based on the time difference $TD_3$, the distance $R_3$ and defined circle $C_3$ around the third transducer 107 is determined. The circles $C_1$, $C_2$, $C_3$ intersect at a single point, $I_1$, which is the location of the portable device 120, i.e. on the operator's side of the vehicle 101.

FIG. 7 illustrates two portable devices 120, and the calculations described above may be similarly applied to the second portable device 120. Here, the second portable device 120 is located on the passenger's side of the vehicle 101. Thus, the computing device 105, having determined the location of both portable devices 120, may apply settings only from the portable device 120 on the operator's side of the vehicle 101.

FIG. 7 further illustrates the notification and the receipt notification. A data collector 110, e.g. an RF antenna, can send and receive RF signals over, e.g., the network 120, and relay the signals to the computing device 105. For example, the computing device 105 may send the notification as an RF signal $RF_1$ to start, e.g., the processes 200, 300. The portable device 120 may send a receipt notification as an RF signal $RF_2$ to send data regarding, e.g., the time of receipt of tones, the time of sending tones, etc.

FIG. 8 illustrates another portion of another exemplary vehicle 101, including two portable devices 120 that arc located according to the process 400 above, using the ellipse calculation. As described above, the transducer 107 and the receiving device are the foci of the ellipse, and the portable device 120 defines the major axis of the ellipse. For example, the major axis $L_1$ is the distance from the transducer 107 to the portable device 120 added to the distance from the portable device 120 to the receiving device. Major axes $L_2$, $L_3$ may be similarly defined for the other transducers 107. When repeated for each of three transducers 107, the three ellipses intersect at a single point $I_1$, the location of the portable device 120.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, sensor measurements, computations, processing time, communications time, etc.

Computing devices 105 generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device 105 is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 200, one or more of the steps could be omitted, or the steps could be executed in a different order than shown in FIG. 2. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The invention claimed is:

1. A system, comprising a computer including a processor and a memory, the memory storing instructions executable by the computer to:

actuate a first transducer to generate a first tone;

upon receipt of the first tone by a portable device, generate a second tone from the portable device;

determine a time difference between generation of the first tone by the first transducer and receipt of the second tone by a receiving device;

identify a major axis of an ellipse based on the time difference, the ellipse having foci at the [portable device] *first transducer* and the receiving device;

determine a location of the portable device based on the ellipse; and apply a set of user settings associated with a vehicle operator upon determining that the location of the portable device is in an operator's side of a vehicle cabin.

2. The system of claim 1, wherein the tones are ultrasonic.

3. The system of claim 1, wherein the instructions further include instructions to send respective tones from a plurality of transducers in a sequence.

4. The system of claim 3, wherein the instructions further include instructions to receive a first notification with the portable device, generate a first ultrasonic tone from the first transducer, and send a receipt notification from the portable device when the portable device receives the first ultrasonic tone, wherein the time difference is the difference in time between the first notification and the receipt notification.

5. The system of claim 1, wherein the instructions further include instructions to send respective tones from a plurality of transducers substantially simultaneously.

6. The system of claim 5, wherein the instructions further include instructions to record a time of receipt for each tone upon receipt by the portable device, send a receipt notification indicating the times of receipt, and determine the time differences based on the times of receipt.

7. The system of claim 1, wherein the instructions further include instructions to generate a third tone from a second transducer and a fourth tone from the portable device upon receipt of the third tone by the portable device, to determine a second major axis of a second ellipse based on a second time difference between generation of the third tone and receipt of the fourth tone by the receiving device, and to determine the position of the portable device based on an intersection point of the ellipse and the second ellipse.

8. The system of claim 7, wherein the instructions further include instructions to generate a fifth tone from a third transducer and a sixth tone from the portable device upon receipt of the fifth tone by the portable device, to determine a third major axis of a third ellipse based on a third time difference between generation of the fifth tone and receipt of the sixth tone by the receiving device, and to determine the position of the portable device based on an intersection point of the ellipse, the second ellipse, and the third ellipse.

9. The system of claim 1, wherein the instructions further include instructions to identify a second portable device on a passenger's side of the vehicle cabin, to ignore a set of user settings from the second portable device, and to apply the set of user settings from the portable device on the operator's side of the vehicle cabin.

10. The system of claim 1, wherein the instructions further include instructions to determine the position of the portable device based at least in part on a distance between the first transducer and the receiving device.

11. A method, comprising:

actuating a first transducer to generate a first tone;

upon receipt of the first tone by a portable device, generating a second tone from the portable device, determining a time difference between generation of the first tone by the first transducer and receipt of the second tone by a receiving device;

identifying a major axis of an ellipse based on the time difference, the ellipse having foci at the [portable device] *first transducer* and the receiving device;

determining a location of the portable device based on the ellipse; and applying a set of user settings associated with a vehicle operator upon determining that the location of the portable device is in an operator's side of a vehicle cabin.

12. The method of claim 11, wherein the tone is an ultrasonic tone.

13. The method of claim 11, further comprising sending respective tones from a plurality of transducers in a sequence.

14. The method of claim 13, further comprising receiving a first notification with the portable device, generating a first ultrasonic tone from the first transducer, and sending a receipt notification from the portable device when the portable device receives the first ultrasonic tone, wherein the time difference is the difference in time between the first notification and the receipt notification.

15. The method of claim 11, further comprising sending respective tones from a plurality of transducers substantially simultaneously.

16. The method of claim 15, further comprising recording a time of receipt for each tone upon receipt by the portable device, sending a receipt notification indicating the times of receipt, and determining the time differences based on the times of receipt.

17. The method of claim 11, further comprising generating a third tone from a second transducer and a fourth tone from the portable device upon receipt of the third tone by the portable device, determining a second major axis of a second ellipse based on a second time difference between generation of the third tone and receipt of the fourth tone by the receiving device, and determining the position of the portable device based on an intersection point of the ellipse and the second ellipse.

18. The method of claim 17, further comprising generating a fifth tone from a third transducer and a sixth tone from the portable device upon receipt of the fifth tone by the portable device, determining a third major axis of a third ellipse based on a third time difference between generation of the fifth tone and receipt of the sixth tone by the receiving device, and determining the position of the portable device based on an intersection point of the ellipse, the second ellipse, and the third ellipse.

19. The method of claim 11, further comprising identifying a second portable device on a passenger's side of the vehicle cabin, ignoring a set of user settings from the second portable device, and applying the set of user settings from the portable device on the operator's side of the vehicle cabin.

20. The method of claim 11, further comprising determining the position of the portable device based at least in part on a distance between the first transducer and the receiving device.

* * * * *